United States Patent
Harper et al.

(10) Patent No.: US 9,769,769 B2
(45) Date of Patent: Sep. 19, 2017

(54) DETECTING PROXIMITY USING ANTENNA FEEDBACK

(71) Applicant: Microsoft Corporation, Redmond, WA (US)

(72) Inventors: Marc Harper, Seattle, WA (US); Marshall Joseph Katz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 14/320,320

(22) Filed: Jun. 30, 2014

(65) Prior Publication Data

US 2015/0382307 A1    Dec. 31, 2015

(51) Int. Cl.
*H04W 52/24* (2009.01)
*H04B 7/02* (2017.01)
*H04W 64/00* (2009.01)
*H01Q 1/50* (2006.01)
*H04B 17/10* (2015.01)
*H04B 7/022* (2017.01)
(Continued)

(52) U.S. Cl.
CPC .......... *H04W 52/246* (2013.01); *H04B 7/022* (2013.01); *H04B 17/103* (2015.01); *H04B 17/13* (2015.01); *H04B 1/3838* (2013.01); *H04W 52/367* (2013.01)

(58) Field of Classification Search
CPC ...... H04B 7/10; H04B 1/3827; H04B 17/103; H04B 1/3838; G01R 27/26; G01R 27/2605; H03K 17/955; H04W 64/00; H04W 52/18; H04W 52/367; H01Q 1/50
See application file for complete search history.

(56) References Cited

U.S. PATENT DOCUMENTS 4,016,490 A    4/1977 Weckenmann et al.
4,729,129 A *  3/1988 Koerner ............... H03G 3/3042
                                                  330/207 P
(Continued)

FOREIGN PATENT DOCUMENTS

CN    1179864 A    4/1998
CN    102064812 A  5/2011
(Continued)

OTHER PUBLICATIONS

International Searching Authority, U.S. Patent and Trademark Office, Updated Search Report for PCT/US2014/072412, mailed Oct. 5, 2015, 3 pages.
(Continued)

*Primary Examiner* — Pablo Tran
(74) *Attorney, Agent, or Firm* — Holzer Patel Drennan

(57) ABSTRACT

An electronic device provides a detuning monitor circuit configured to detect a change in a voltage standing wave ratio (VSWR) between a radio frequency (RF) transmitter and an RF antenna relative to a predetermined VSWR baseline and a proximity detector circuit configured to adjust transmission power of a carrier wave transmitted from the RF transmitter, if the change fails to satisfy an acceptable VSWR condition. Network proximity detectors are also provided to allow coordination of antenna subsystems to comply with specific absorption rate (SAR) constraints and/or maintain/improve antenna performance.

20 Claims, 7 Drawing Sheets

(51) Int. Cl.
  *H04B 17/13* (2015.01)
  *H04B 1/3827* (2015.01)
  *H04W 52/36* (2009.01)

(56) References Cited

U.S. PATENT DOCUMENTS

| | | | |
|---|---|---|---|
| 4,806,944 A * | 2/1989 | Jacomb-Hood | H01Q 3/26 |
| | | | 343/745 |
| 5,166,679 A | 11/1992 | Vranish et al. | |
| 5,212,621 A | 5/1993 | Panter | |
| 5,408,690 A * | 4/1995 | Ishikawa | G01R 27/06 |
| | | | 324/646 |
| 5,564,086 A * | 10/1996 | Cygan | H04B 1/0458 |
| | | | 333/17.3 |
| 6,178,310 B1 * | 1/2001 | Jeong | H04B 17/318 |
| | | | 455/121 |
| 6,657,595 B1 * | 12/2003 | Phillips | H01Q 1/362 |
| | | | 343/702 |
| 6,989,745 B1 | 1/2006 | Milinusic et al. | |
| 7,009,944 B1 | 3/2006 | Hulbert | |
| 7,053,629 B2 | 5/2006 | Nevermann | |
| 7,062,288 B2 | 6/2006 | Raaf et al. | |
| 7,071,776 B2 | 7/2006 | Forrester et al. | |
| 7,124,193 B1 | 10/2006 | Leung et al. | |
| 7,146,139 B2 | 12/2006 | Nevermann | |
| 7,151,382 B1 * | 12/2006 | Kean | G01R 21/07 |
| | | | 324/645 |
| 7,162,264 B2 | 1/2007 | Vance | |
| 7,167,093 B2 | 1/2007 | Fergusson | |
| 7,541,874 B2 * | 6/2009 | Maeda | H03F 1/565 |
| | | | 330/296 |
| 7,729,715 B2 | 6/2010 | Love et al. | |
| 7,917,175 B2 * | 3/2011 | Song | G01R 27/06 |
| | | | 455/561 |
| 8,063,375 B2 | 11/2011 | Cobbinah et al. | |
| 8,134,461 B2 | 3/2012 | Van Dorrn | |
| 8,208,423 B2 | 6/2012 | Liu et al. | |
| 8,213,982 B2 | 7/2012 | Marlett et al. | |
| 8,269,511 B2 | 9/2012 | Jordan | |
| 8,324,549 B2 | 12/2012 | Romero et al. | |
| 8,326,385 B2 * | 12/2012 | Brogle | G01D 5/2405 |
| | | | 455/522 |
| 8,401,851 B2 | 3/2013 | Bushey | |
| 8,417,296 B2 | 4/2013 | Caballero et al. | |
| 8,432,322 B2 | 4/2013 | Amm et al. | |
| 8,442,572 B2 | 5/2013 | Borran et al. | |
| 8,466,839 B2 | 6/2013 | Schlub et al. | |
| 8,483,632 B2 | 7/2013 | Asrani et al. | |
| 8,515,496 B2 | 8/2013 | Cheng et al. | |
| 8,547,952 B2 | 10/2013 | Liu et al. | |
| 8,548,388 B2 | 10/2013 | Chiu et al. | |
| 8,559,999 B2 | 10/2013 | Hu et al. | |
| 8,565,205 B2 | 10/2013 | Ho et al. | |
| 8,577,289 B2 | 11/2013 | Schlub et al. | |
| 8,723,531 B2 * | 5/2014 | Harrison | G01R 27/06 |
| | | | 324/637 |
| 8,723,749 B2 | 5/2014 | Lin et al. | |
| 8,775,103 B1 | 7/2014 | Jayaraj et al. | |
| 8,781,437 B2 | 7/2014 | Ngai et al. | |
| 8,792,930 B1 | 7/2014 | Gopalakrishnan et al. | |
| 8,798,695 B1 | 8/2014 | Zheng et al. | |
| 8,860,526 B2 * | 10/2014 | Manssen | H03H 7/40 |
| | | | 333/17.3 |
| 8,922,443 B2 | 12/2014 | Zhu et al. | |
| 8,975,903 B2 | 3/2015 | Salter et al. | |
| 9,325,355 B2 * | 4/2016 | Pecen | H04B 1/0458 |
| 9,337,833 B2 | 5/2016 | Siska | |
| 9,466,872 B2 | 10/2016 | Sanchez et al. | |
| 2002/0009976 A1 | 1/2002 | Rashidi | |
| 2002/0039028 A1 | 4/2002 | Douglas et al. | |
| 2002/0175814 A1 | 11/2002 | Wadlow et al. | |
| 2003/0064732 A1 | 4/2003 | McDowell et al. | |
| 2003/0064761 A1 | 4/2003 | Nevermann | |
| 2003/0210203 A1 | 11/2003 | Phillips et al. | |
| 2003/0214310 A1 | 11/2003 | McIntosh | |
| 2003/0228846 A1 | 12/2003 | Berliner et al. | |
| 2004/0021608 A1 | 2/2004 | Kojima et al. | |
| 2004/0075613 A1 | 4/2004 | Jarmuszewski et al. | |
| 2004/0108957 A1 | 6/2004 | Umehara et al. | |
| 2004/0113847 A1 | 6/2004 | Qi et al. | |
| 2004/0160378 A1 | 8/2004 | Abrams et al. | |
| 2004/0222925 A1 | 11/2004 | Fabrega-Sanchez et al. | |
| 2005/0017906 A1 | 1/2005 | Man et al. | |
| 2005/0093624 A1 | 8/2005 | Qllikainen et al. | |
| 2005/0184914 A1 | 8/2005 | Ollikainen et al. | |
| 2006/0244663 A1 | 11/2006 | Fleck et al. | |
| 2007/0111681 A1 | 5/2007 | Alberth, Jr. et al. | |
| 2007/0120745 A1 | 5/2007 | Qi et al. | |
| 2007/0122307 A1 | 5/2007 | Da Costa et al. | |
| 2008/0051165 A1 | 2/2008 | Burgan et al. | |
| 2008/0055160 A1 | 3/2008 | Kim et al. | |
| 2008/0158065 A1 | 7/2008 | Wee | |
| 2008/0218493 A1 | 9/2008 | Patten et al. | |
| 2008/0254836 A1 | 10/2008 | Qi et al. | |
| 2009/0047998 A1 | 2/2009 | Alberth, Jr. | |
| 2009/0230884 A1 | 9/2009 | Van Doorn | |
| 2009/0253459 A1 | 10/2009 | Naganuma et al. | |
| 2009/0295648 A1 | 12/2009 | Dorsey et al. | |
| 2009/0305742 A1 | 12/2009 | Caballero | |
| 2009/0325511 A1 * | 12/2009 | Kim | G01D 21/00 |
| | | | 455/84 |
| 2010/0026664 A1 | 2/2010 | Geaghan | |
| 2010/0052997 A1 | 3/2010 | Kan et al. | |
| 2010/0056210 A1 | 3/2010 | Bychkov et al. | |
| 2010/0067419 A1 | 3/2010 | Liu et al. | |
| 2010/0113111 A1 | 5/2010 | Wong et al. | |
| 2010/0234058 A1 | 9/2010 | Hu et al. | |
| 2010/0234081 A1 | 9/2010 | Wong et al. | |
| 2010/0279751 A1 | 11/2010 | Pourseyed et al. | |
| 2010/0283691 A1 | 11/2010 | Su et al. | |
| 2010/0317302 A1 | 12/2010 | Greenwood et al. | |
| 2010/0321325 A1 | 12/2010 | Springer et al. | |
| 2011/0001675 A1 | 1/2011 | Lee | |
| 2011/0012793 A1 | 1/2011 | Amm et al. | |
| 2011/0012794 A1 | 1/2011 | Schlub et al. | |
| 2011/0043408 A1 | 2/2011 | Shi et al. | |
| 2011/0063042 A1 * | 3/2011 | Mendolia | H01P 5/04 |
| | | | 333/17.3 |
| 2011/0117973 A1 | 5/2011 | Asrani et al. | |
| 2011/0124363 A1 | 5/2011 | Calvarese et al. | |
| 2011/0157077 A1 | 6/2011 | Martin et al. | |
| 2011/0199267 A1 | 8/2011 | Hayashi | |
| 2011/0222469 A1 | 9/2011 | Ali et al. | |
| 2011/0250928 A1 | 10/2011 | Schlub et al. | |
| 2011/0298669 A1 | 12/2011 | Rao | |
| 2012/0021707 A1 | 1/2012 | Forrester et al. | |
| 2012/0021800 A1 | 1/2012 | Wilson et al. | |
| 2012/0023225 A1 | 1/2012 | Imes et al. | |
| 2012/0044115 A1 | 2/2012 | McCaughey et al. | |
| 2012/0071195 A1 | 3/2012 | Chakraborty et al. | |
| 2012/0074961 A1 | 3/2012 | Herrmann | |
| 2012/0133561 A1 | 5/2012 | Konanur et al. | |
| 2012/0147801 A1 | 6/2012 | Ho et al. | |
| 2012/0164962 A1 | 6/2012 | Lin et al. | |
| 2012/0172079 A1 | 7/2012 | Baldemair et al. | |
| 2012/0178494 A1 | 7/2012 | Haim et al. | |
| 2012/0190398 A1 | 7/2012 | Leukkunen | |
| 2012/0214422 A1 | 8/2012 | Shi et al. | |
| 2012/0223865 A1 | 9/2012 | Lie et al. | |
| 2012/0231784 A1 | 9/2012 | Kazmi | |
| 2012/0270519 A1 | 10/2012 | Ngai et al. | |
| 2012/0270592 A1 | 10/2012 | Ngai et al. | |
| 2012/0295554 A1 * | 11/2012 | Greene | H04B 1/0458 |
| | | | 455/77 |
| 2012/0298497 A1 | 11/2012 | Maeda et al. | |
| 2012/0299792 A1 | 11/2012 | Shtrom et al. | |
| 2012/0315847 A1 | 12/2012 | Li et al. | |
| 2012/0329517 A1 | 12/2012 | Elin | |
| 2012/0329524 A1 | 12/2012 | Kent et al. | |
| 2013/0005413 A1 | 1/2013 | Brogle et al. | |
| 2013/0016621 A1 | 1/2013 | Kil et al. | |
| 2013/0026846 A1 | 1/2013 | Gianesello et al. | |
| 2013/0033400 A1 | 2/2013 | Chiang | |

(56) References Cited

U.S. PATENT DOCUMENTS

| | | |
|---|---|---|
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0137487 A1 | 5/2013 | Sato |
| 2013/0149957 A1 | 6/2013 | Desclos et al. |
| 2013/0157564 A1 | 6/2013 | Shi |
| 2013/0169348 A1 | 7/2013 | Shi |
| 2013/0178167 A1 | 7/2013 | Lockerbie et al. |
| 2013/0178174 A1 | 7/2013 | Geris et al. |
| 2013/0203363 A1 | 8/2013 | Gratt et al. |
| 2013/0210477 A1 | 8/2013 | Peter |
| 2013/0217342 A1 | 8/2013 | Abdul-Gaffoor et al. |
| 2013/0241670 A1* | 9/2013 | Mikhemar ............... H04B 1/52 |
| | | 333/126 |
| 2013/0278474 A1 | 10/2013 | Lenormand et al. |
| 2013/0293244 A1 | 11/2013 | Leek |
| 2013/0300618 A1 | 11/2013 | Yarga et al. |
| 2013/0310105 A1 | 11/2013 | Sagae et al. |
| 2013/0310106 A1 | 11/2013 | Wang et al. |
| 2013/0314365 A1 | 11/2013 | Woolley et al. |
| 2013/0335291 A1* | 12/2013 | Judson .................... H01Q 1/50 |
| | | 343/861 |
| 2014/0015595 A1 | 1/2014 | VanAusdall et al. |
| 2014/0021801 A1 | 1/2014 | Kao et al. |
| 2014/0066124 A1 | 3/2014 | Novet |
| 2014/0071008 A1 | 3/2014 | Desclos et al. |
| 2014/0078094 A1 | 3/2014 | Yang |
| 2014/0087663 A1 | 3/2014 | Burchill et al. |
| 2014/0098491 A1 | 4/2014 | Wang |
| 2014/0098693 A1 | 4/2014 | Tabet et al. |
| 2014/0128032 A1 | 5/2014 | Muthukumar |
| 2014/0139380 A1 | 5/2014 | Ouyang et al. |
| 2014/0141733 A1 | 5/2014 | Wong et al. |
| 2014/0152121 A1 | 6/2014 | Ku |
| 2014/0155000 A1 | 6/2014 | Erkens |
| 2014/0159980 A1 | 6/2014 | Finegold |
| 2014/0173269 A1 | 6/2014 | Varoglu et al. |
| 2014/0176938 A1 | 6/2014 | Yang et al. |
| 2014/0206297 A1 | 7/2014 | Schlub et al. |
| 2014/0274188 A1 | 9/2014 | Thorson |
| 2014/0274189 A1 | 9/2014 | Moller et al. |
| 2014/0280450 A1 | 9/2014 | Luna |
| 2014/0292587 A1 | 10/2014 | Yarga et al. |
| 2014/0307570 A1 | 10/2014 | Hong |
| 2014/0315592 A1 | 10/2014 | Schlub et al. |
| 2014/0357207 A1 | 12/2014 | Ma |
| 2014/0357313 A1 | 12/2014 | Mercer et al. |
| 2014/0370929 A1 | 12/2014 | Khawand et al. |
| 2015/0031408 A1 | 1/2015 | Kalla et al. |
| 2015/0053575 A1 | 2/2015 | Bridges et al. |
| 2015/0141080 A1 | 5/2015 | Standing |
| 2015/0169093 A1 | 6/2015 | Nakao |
| 2015/0177371 A1 | 6/2015 | Abbasi et al. |
| 2015/0199042 A1 | 7/2015 | Standing et al. |
| 2015/0200444 A1 | 7/2015 | Mercer et al. |
| 2015/0201385 A1 | 7/2015 | Mercer et al. |
| 2015/0201387 A1 | 7/2015 | Khawand et al. |
| 2015/0288074 A1 | 10/2015 | Harper et al. |
| 2016/0049978 A1 | 2/2016 | Mercer et al. |
| 2016/0064801 A1 | 3/2016 | Han et al. |
| 2016/0098053 A1 | 4/2016 | Khawand et al. |
| 2016/0164563 A1 | 6/2016 | Khawand et al. |
| 2016/0204836 A1 | 7/2016 | Lee et al. |

FOREIGN PATENT DOCUMENTS

| | | |
|---|---|---|
| CN | 202276339 U | 6/2012 |
| CN | 102714346 A | 10/2012 |
| CN | 103248747 A | 8/2013 |
| EP | 843421 | 5/1998 |
| EP | 1298809 | 4/2003 |
| EP | 1469550 A3 | 12/2004 |
| EP | 100504407 C | 10/2006 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 | 11/2011 |
| EP | 2405534 A1 | 1/2012 |
| EP | 2410661 | 1/2012 |
| EP | 2509229 | 10/2012 |
| EP | 2509229 A1 | 10/2012 |
| EP | 2568605 A1 | 3/2013 |
| EP | 2787780 A1 | 10/2014 |
| GB | 2293277 A | 3/1996 |
| GB | 2380359 | 4/2003 |
| GB | 2409345 A1 | 6/2005 |
| JP | 2002043957 A | 2/2002 |
| JP | 2007194995 A | 8/2007 |
| WO | 0042797 | 7/2000 |
| WO | 0148858 A3 | 7/2001 |
| WO | 2004015813 A1 | 2/2004 |
| WO | 2004091046 A1 | 10/2004 |
| WO | 2005018046 A1 | 2/2005 |
| WO | 2007043150 A1 | 4/2007 |
| WO | 2009149023 A1 | 12/2009 |
| WO | 2011051554 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 | 7/2013 |
| WO | 2013141791 A1 | 9/2013 |
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

International Searching Authority, U.S. Patent and Trademark Office, Updated Written Opinion for PCT/US2014/072412, mailed Oct. 5, 2015, 8 pages.

International Searching Authority, U.S. Patent and Trademark Office, Search Report and Written Opinion for PCT/US2014/072413, dated Jul. 16, 2015, 16 pages.

"SAR Evaluation Considerations for Laptop, Notebook, Netbook and Tablet Computers," Federal Communications Commission Office of Engineering and Technology Laboratory Division, May 28, 2013, 14 pages.

Hochwald, et al "Minimizing Exposure to Electromagnetic Radiation in Portable Devices", In Proceedings of Information Theory and Applications Workshop, Feb. 5, 2012, pp. 107.

International Searching Authority, United States Patent and Trademark Office, International Preliminary Report on Patentability, Application No. PCT/US2014/039479, dated Jun. 15, 2015, 8 pages.

International Searching Authority, United States Patent and Trademark Office, Second Written Opinion of IPEA for PCT/US2014/065856, mailed Oct. 13, 2015, 6 pages.

Myllymaki, Sami "Capacitive Antenna Sensor for Proximity Recognition"; http://herkules.oulu.fi/isbn9789514299155/isbn9789514299155.pdf, dated Nov. 30, 2012, 60 pages.

International Searching Authority, United States Patent and Trademark Office, Search Report and Written Opinion for PCT/US2014/065856, dated Feb. 4, 2015, 10 pages.

International Searching Authority, U.S. Patent and Trademark Office, International Search Report and Written Opinion for PCT/US2015/037593, dated Aug. 20, 2015; mailed Aug. 31, 2015, 13 pages.

(56) References Cited

OTHER PUBLICATIONS

International Searching Authority, U.S. Patent and Trademark Office, International Search Report for PCT/US2015/037563 dated Aug. 20, 2015, 5 pages.
International Searching Authority, U.S. Patent and Trademark Office, Written Opinion for PCT/US2015/037563, mailed Aug. 31, 2015, 6 pages.
"Digital, Silicon Microphone has 2.6×1.6mm2 Footprint", Published on: Dec. 12, 2005, Available at: http://news.thomasnet.com/fullstory/Digital-Silicon-Microphone-has-2-6-x-1-6-mm-footprint-471386.
Khawand, et al., "Radiating Structure with Integrated Proximity Sensing" formerly titled as "SAR Sensor Execution where Part of One or More Antennas is on the Exterior Surface of a Mobile Device", unfiled US Patent Application (filed herewith).
Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.
Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.
U.S. Appl. No. 13/918,846, Pai, et al., "Radio Frequency (RF) Power Back-Off Optimization for Specific Absorption Rate (SAR) Compliance", filed Jun. 14, 2013.
"Low SAR Solution for Tablet PC", Published on: Sep. 27, 2011, Available at: http://www.auden.com.tw/TRC/webspace/disk/AudenSARSolutiondatasheet__110927.pdf.
"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.
Toit, Riaan Du, "Using Proximity Sensing to Meet Mobile Device FCC SAR Reulations", Published on: Apr. 17, 2012, Available at: http://www.eetimes.com/General/PrintView/431201.
Khawand, et al., "Radio Frequency (RF) Power Back-Off Optimization for Specific Abdorption Rate (SAR) Compliance", U.S. Appl. No. 13/918,846, filed Jun. 14, 2013, 40 pages.
International Searching Authority, United States Patent and Trademark Office, International Search Report and Written Opinion for Application No. PCT/US2014/042023, Aug. 29, 2014, 11 Pages.
International Searching Authority, United States Patent and Trademark Office, International Search Report and Written Opinion for Application No. PCT/US2014/039479, Sep. 19, 2014, 11 Pages.
International Searching Authority, United States Patent and Trademark Office, International Search Report and Written Opinion for Application No. PCT/US2014/072411, Mar. 27, 2015, 10 Pages.
International Searching Authority, Unitd States Patent and Trademark Office, International Search Report and Written Opinion for Application No. PCT/US2014/072412, Mar. 30, 2015, 11 Pages.
International Searching Authority, United States Patent and Trademark Office, International Search Report and Written Opinion for Application No. PCT/US2014/072414, Apr. 14, 2015, 9 Pages.
Mrazovac, "Reaching the Next Level of Indoor Human Presence Detection: An RF Based Solution", 11th International Conference on Telecommunications in Modern Satellite, Cable and Broadcasting Services, Oct. 16, 2013, 4 pages.
I.B. Bonev et al, "Parmetric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
J. Poutanen, "Interaction Between Mobile Terminal Antenna and User" Helsinki University of Technology Master's Thesis, Oct. 9, 2007, 100 pages.

International Searching Authority, United States Patent and Trademark Office, Second Written Opinion, Application No. PCT/US2014/042023, Mar. 2, 2015, 6 Pages.
Sterner, et al., "Development of an Antenna Sensor for Occupant Detection in Passenger Transportation", In Proceedings of Procedia Engineering, vol. 47, Sep. 9, 2012, 6 pages.
Poutanent, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Curto, et al., "Circular Loop Antenna Operating at 434 MHz for Medical Applications: Loop-Tissue Interaction", In Proceeding of: Irish Signals and Systems Conference, Jul. 2006, 6 pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384,7 pages.
Mercer, et al., "Dynamic Antenna Power Control for Multi-Context Device", U.S. Appl. No. 14/987,964, filed Jan. 5, 2016, 52 pages.
"Non-Final Office Action", U.S. Appl. No. 14/152,351, Feb. 20, 2015, 10 pages.
"Non-Final Office Action", U.S. Appl. No. 13/905,088, Mar. 23, 2015, 37 pages.
"Non-Final Office Action", U.S. Appl. No. 14/152,652, Jul. 16, 2015, 9 pages.
"Non-Final Office Action", U.S. Appl. No. 14/152,086, Jul. 22, 2015, 13 pages.
"Non-Final Office Action", U.S. Appl. No. 14/152,529, Sep. 22, 2015, 18 pages.
"Non-Final Office Action", U.S. Appl. No. 13/918,846, Sep. 23, 2015, 16 pages.
"Non-Final Office Action", U.S. Appl. No. 14/152,086, Nov. 30, 2015, 19 pages.
"Non-Final Office Action", U.S. Appl. No. 14/562,212, Dec. 18, 2015, 16 pages.
"Non-Final Office Action", U.S. Appl. No. 14/927,287, Dec. 21, 2015, 28 pages.
"Final Office Action", U.S. Appl. No. 14/152,652, Dec. 23, 2016, 9 pages.
"Non-Final Office Action", U.S. Appl. No. 14/152,529, Jan. 22, 2016, 18 pages.
Office Action Issued in United Kingdom Patent Application No. 1219096.3, Mailed Date: Jan. 28, 2016, 4 Pages.
"Final Office Action", U.S. Appl. No. 13/918,846, Mar. 2, 2016, 20 pages.
"Non-Final Office Action", U.S. Appl. No. 14/152,652, Apr. 18, 2016 9 pages.
"Final Office Action Issued in U.S. Appl. No. 14/927,287", Mailed Date: May 11, 2016, 34 Pages.
"Non-Final Office Action", U.S. Appl. No. 14/086,866, Mailed Date: May 19, 2016, 7 pages.
Office Action Issued in Chinese Patent Application No. 201380055749.X, Mailed Date: Jun. 6, 2016, 12 Pages.
"Non-Final Office Action", U.S. Appl. No. 13/918,846, Jun. 14, 2016, 21 pages.
"Final Office Action", U.S. Appl. No. 14/562,212, Jun. 17, 2016, 17 pages.
"Non-Final Office Action", U.S. Appl. No. 14/506,478, Jul. 1, 2016, 10 pages.
International Searching Authority, United States Patent and Trademark Office, International Search Report and Written Opinion for Application No. PCT/US2013/066441, Mailed Date: Dec. 12, 2013, 12 Pages.
International Preliminary Examining Authority, United States Patent and Trademark Office, International Preliminary Report on Patentability, Application No. PCT/US2013/066441, dated May 7, 2015, 9 pages.
International Searching Authority, United States Patent and Trademark Office, Second International Search Report and Written Opinion for PCT/US2014/072412; mailing date: Oct. 5, 2015, 11 pages.
Second Written Opinion Issued in PCT Application No. PCT/US2014/072411, Mailed Date: Nov. 26, 2015, 7 Pages.

(56) References Cited

OTHER PUBLICATIONS

International Searching Authority, U.S. Patent and Trademark Office, Second Written Opinion of International Preliminary Examining Authority for PCT/US2014/072412, mailed Dec. 4, 2015, 5 pages.
International Searching Authority, U.S. Patent and Trademark Office, Second Written Opinion of the International Preliminary Examining Authority for PCT/US2014/072414 mailed Dec. 9, 2015, 29 pages.
International Searching Authority, U.S. Patent and Trademark Office, Second Written Opinion of the International Preliminary Examining Authority for PCT/US2014/072413 mailed Dec. 17, 2015, 6 pages.
International Seraching Authority, U.S. Patent and Trademark Office, International Search Report and Written Opinion for PCT/US2015/062851, mailed Feb. 5, 2016, 11 pages.
International Preliminary Examining Authority, International Preliminary Report on Patentability for PCT/US2014/065856, date mailed: Feb. 10, 2016, 14 pages.
International Preliminary Report of Patentability issued in PCT Application No. PCT/US2014/072412; mailed date: Mar. 22, 2016, 7 pages.
International Preliminary Examining Authority, International Preliminary Report on Patentability for PCT/US2014/072411; date mailed Mar. 23, 2016, 8 pages.
International Preliminary Examining Authority, International Preliminary Report on Patentability for PCT/US2014/072414; date mailed Mar. 23, 2016, 7 pages.
International Preliminary Examining Authority, International Preliminary Report on Patentability for PCT/US2014/072413, date mailed Mar. 24, 2016, 7 pages.
International Preliminary Examining Authority, Second Written Opinion of the International Preliminary Examining Authority for PCT/2015/037563, mailed Jun. 1, 2016, 5 pages.
Second Written Opinion Issued in PCT Application No. PCT/US2015/052769, Mailed Date: Jul. 7, 2016, 5 Pages.
Office Action Issued in Columbian Patent Application No. NC2016/0000122, Mailed Date: Aug. 19, 2016, 2 Pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications", In Proceedings of 10th European Conference on Antennas and Propagation, Apr. 2016, 4 Pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages.
Harper, "Loop Antenna With Integrated Proximity Sensing", U.S. Appl. No. 15/412,997, filed Jan. 23, 2016, 32 pages.
"Non-Final Office Action", U.S. Appl. No. 14/086,866, Mailed Date: Oct. 17, 2016, 7 pages.
"Final Office Action", U.S. Appl. No. 13/918,846, Oct. 26, 2016, 25 pages.
"Non-Final Office Action", U.S. Appl. No. 14/987,964, Mailed Date: Nov. 30, 2016, 8 pages.
First Office Action and Search Report Issued in Chinese Patent Application No. 201480031132.9, Mailed Date: Nov. 2, 2016, 10 Pages.
First Office Action Issued in Chinese Patent Application No. 201480033869.4, Mailed Date: Dec. 19, 2016, 6 Pages.
International Preliminary Examining Authority, International Preliminary Report on Patentability for PCT/US2015/037563, mailed Sep. 13, 2016, 11 pages.
International Preliminary Examining Authority, International Preliminary Report on Patentability for PCT/US2015/052769, mailed Sep. 29, 2016, 16 pages.
"Second Written Opinion Issued in PCT Application No. PCT/US2015/062851", Mailed Date: Oct. 28, 2016, 8 Pages.

\* cited by examiner

DETECTING PROXIMITY USING ANTENNA FEEDBACK

BRIEF DESCRIPTIONS OF THE DRAWINGS

DETAILED DESCRIPTIONS

Consumer electronic devices may be equipped with wireless communication circuitry that makes use of radio frequency (RF) electromagnetic fields. For example, the wireless communications circuitry may transmit and receive RF signals in mobile telephone RF bands, WiFi network RF bands, GPS RF bands, near-field communication (NFC) bands, and other RF bands that may be associated with a telecommunications specification. To protect humans from harmful levels of RF radiation when using such devices, government agencies have imposed regulations limiting RF transmission power from some wireless electronic devices, such as tablet computers and mobile phones. Reducing RF transmission power may utilize valuable resources in mobile devices and decrease performance of device features in some electronic devices.

In some jurisdictions, specific absorption rate (SAR) specifications are in place imposing maximum energy absorption constraints on electronic device manufacturers. These specifications articulate restrictions on the amount of electromagnetic radiation that may be emitted based on proximity of a transmitting radio frequency (RF) antenna. Particular attention is given to radiation limits at distances within a few centimeters from the device (e.g., 0-3 centimeters), where users are likely to place a human body part near the transmitting antenna. Such restrictions may be satisfied by reducing transmitted carrier signal strength when a dielectric body (e.g., a human body part) is detected in the proximity of the transmitter.

Implementations of the disclosed technology provide an electronic device that dynamically alters the power of a transmitted carrier wave responsive to detected changes in the voltage standing wave ratio (VSWR) between an antenna and a transmitter connected to the antenna. A user in proximity of the antenna influences the tuning of the antenna in a detectable manner, allowing for the dynamic power alteration that achieves compliance with SAR specifications without significantly compromising performance of the electronic device.

Figure 1:
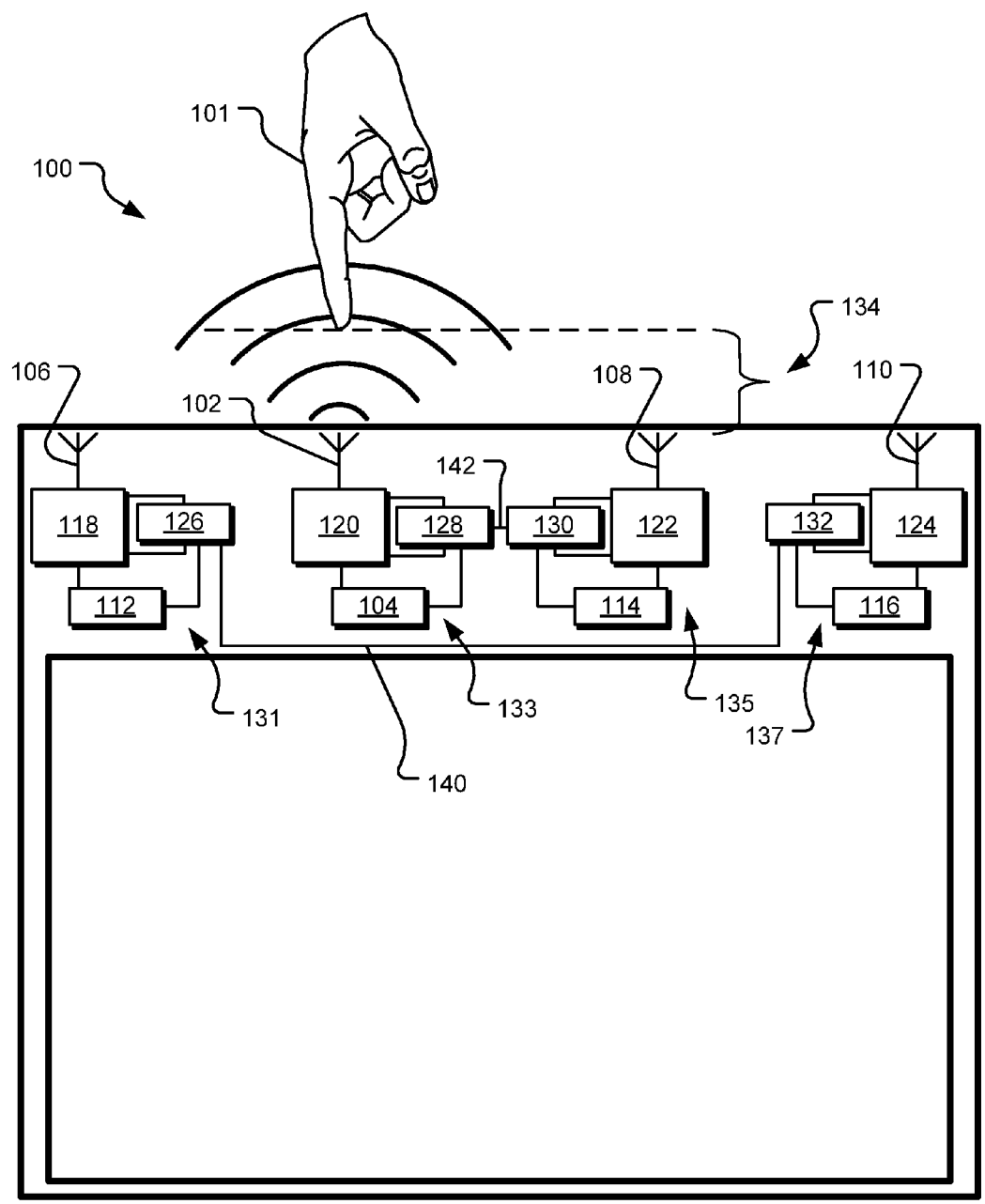
FIG. 1 illustrates an example electronic device that provides for dynamic power adjustment of a transmitted carrier wave responsive to a detected change in VSWR between the antenna and the transmitter connected to the antenna.

FIG. 1 illustrates an example electronic device 100 that provides for dynamic power adjustment of a transmitted carrier wave responsive to a detected change in VSWR between the antenna 102 and the transmitter 104 connected to the antenna 102. Four antennas 102, 106, 108, and 110 are shown in FIG. 1 along with their corresponding transmitters 104, 112, 114, and 116. In one implementation, the first inner antenna 102 and the second inner antenna 108 are substantially identical and operate in a first frequency band, while the first outer antenna 106 and the second outer antenna 110 are substantially identical and operate in a second frequency band. For example, the first inner antenna 102 and the second inner antenna 108 may receive and send radio signals over a wireless local area network. The wireless local area network may be based on the IEEE 802.11 specification, or other industry-standard specification. The IEEE 802.11 (i.e., "WiFi") may operate in two frequency bands, the first being 2400 to 2500 MHz and the second being 5725 to 5875 MHz. In the same or another implementation, the first outer antenna 106 and the second outer antenna 110 receive and send radio signals in a frequency band allocated for cellular transmissions, or approximately 0.7 to 2.7 GHz. These frequency bands may correspond with communications specifications including, for example, LTE, WiMax, 4G, 3G, 2G, Bluetooth, IEEE 802.11, Near-field communication (NFC), RFID, and others. Operational frequency bands for individual antennas are based in part on the antenna properties and the corresponding transmitter carrier wave delivered to the antenna.

In the example of FIG. 1, the inner antenna pair 102 and 108 and outer antenna pair 106 and 110 operate to monitor proximity of a conductive body 110 (such as a human body part) and to dynamically adjust the transmission power emanating from the antenna in the proximity of the conductive body 110. In this manner, the electronic device 100 may comply with SAR constraints and protect a human user from excessive RF wave absorption.

Between each transmitter-antenna pair is a detuning monitor, such as detuning monitor circuits 118, 120, 122, and 124, used to monitor the voltage standing wave ratio (VSWR) between the input and output of the detuning monitor, referred to as the input-output VSWR. Generally, the VSWR represents the voltage ratio between a maximum standing wave amplitude at one node to the minimum standing wave amplitude at another node. As such, the detuning monitor circuit 118 detects changes in the VSWR between an input node (e.g., from an input node coupled to the transmitter 112) and an output node (e.g., an output node coupled to the antenna 106).

When compared to a baseline input-output VSWR (e.g., measured under conditions in which a conductive body is not within effective proximity of the transmitting antenna or some other appropriate baseline), a difference between the baseline VSWR and continuously or periodically measured VSWR values can be tested by a proximity detector (such as proximity detector circuits 126, 128, 130, or 132) to determine whether the difference fails to satisfy a predetermined acceptable VSWR condition. Using an example antenna subsystem 133 including the detuning monitor circuit 120, the antenna 102, the proximity detector circuit 128, and the RF transmitter 104, failure to satisfy the predetermined acceptable VSWR condition, relative to the baseline VSWR, indicates an unacceptable proximity 134 of the conductive body 110 to the antenna 102. When the proximity detector circuit 128 detects this state, the proximity detector circuit 128 adjusts the transmission power from the corresponding transmitter 104 to satisfy SAR constraints (e.g., reducing the transmission power while the predetermined acceptable VSWR condition is not satisfied). Similar operations and coupling structures may be applied to the other antenna subsystems 131, 135, and 137 shown in FIG. 1.

In this manner, proximity detector circuit 128 closes a feedback loop. The proximity detector circuit 128 may be controlled by a control unit, such as a processor or controller programmed with firmware or software, or state machine implemented with digital memory and logic (not shown). The control unit may provide control signals to the proximity detector circuit 128 to communicate when the proximity detector circuit 128 shall take a proximity measurement and by how much the transmission power shall be decreased in response to a non-compliant SAR condition. The time delay between successive measurements and power reductions may be dynamically selected to account for quickly changing conditions, e.g., a rapidly approaching hand or a static situation, for example, in which a device is set on a table without any persons in proximity. As an alternative to separate control unit, the control functionality may be integrated in proximity circuit 128.

Proximity detector circuit 128 may be constructed from analog or digital circuits, or a combination of both digital and analog circuits. Proximity detector circuit 128 may include one or more analog-to-digital converters to convert the standing wave voltage signals to digital data, which is then compared, for example, by measuring VSWR, to determine proximity. A look-up table may provide the association between VSWR and physical proximity. Alternative, a formula relating VSWR to proximity may be programmed into the control unit or proximity detector circuit 128. Additionally processing of the measured VSWR may be performed, such as, for example, filtering or integrating measurements over time.

Antenna subsystems 131 and 137 are coupled (see coupling 140) to allow the proximity detectors 126 and 132 to communicate proximity parameters (e.g., a VSWR stream, status relative to the predetermined acceptable VSWR condition, etc.). As such, the antenna subsystems can 131 and 137 can work in concert to satisfy SAR constraints and/or improve antenna performance in the presence of an unacceptable proximity condition. For example, if the antenna subsystem 131 detects an unacceptable proximity condition but the antenna subsystems 137 detects an acceptable proximity condition (i.e., the predetermined acceptable proximity condition is satisfied), the subsystems 131 and 137 can communicate across the coupling 140 to coordinate a decrease in transmission power at the transmitter 112 and an increase at the transmitter 116. In this manner, the reduction in transmission power at transmitter 112, due to SAR constraints, may be offset to some extent by an increase in transmission power at the transmitter 116, thereby balancing transmission power based on proximity detection among multiple transmitters. Such a network of antenna subsystems may be expanded to more than two subsystems (e.g., to antenna subsystems at all four corners of a tablet computer system). The antenna subsystem 133 and 135 can cooperate in a similar fashion via the coupling 142. In an implementation antenna subsystems for different frequency ranges may also be coordinated to obtain a wider range and/or finer resolution of proximity detection (e.g., if all four antenna subsystems 131, 133, 135, and 137 are networked to cooperate, proximity may be detected across the entire length of the top of the electronic device 100.

The predetermined acceptable proximity condition for the amplified antenna subsystem (e.g., antenna subsystem 137) may be adjusted according to transmission power. As such, if the transmission power of the transmitter 116 is increased, the predetermined acceptable proximity condition may be adjusted to satisfy SAR constraints in the presences of increased transmission power. Such adjustments may, for example, be predetermined and stored in a data table accessible to the proximity detector circuit 124 (e.g., having different predetermined acceptable proximity conditions for different transmission powers).

Furthermore, antenna subsystem coordination may be used to identify false positives (e.g., circumstances in which the proximity condition is not subject to SAR constraints, such as when the computing device is laid flat on a metal table). For example, SAR testing conditions may address a single antenna subsystem one-at-a-time, where coordinating antenna subsystems may determine that a failure of four coordinated antenna subsystems (e.g., across the top edge of the electronic device 100 or at four corners of the electronic device 100) implies the proximity of a metal surface as opposed to hands or a head of a human. Under such conditions, the proximity detectors may determine that the proximity detection is a false positive, relative to human safety and SAR constraints, and therefore determine that a reduction in transmission power is not appropriate. Other similar conditions may be applied depending on SAR conditions tested, antenna subsystem locations, and the configuration and structure of the electronic device 100.

Figure 2:
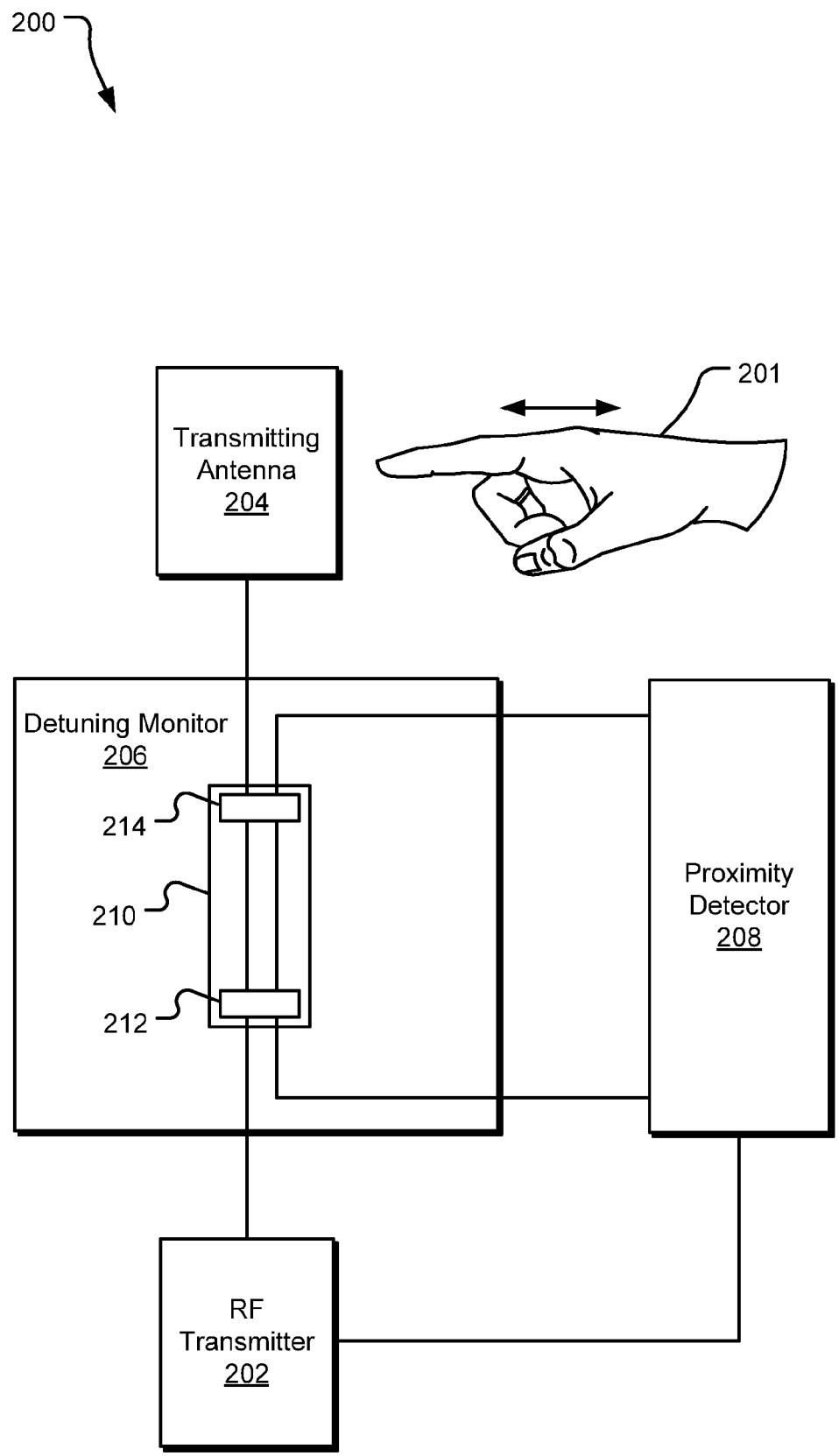
FIG. 2 illustrates example electrical components and data flows for a wireless transmission system with a mechanism for dynamic transmission power adjustment.

FIG. 2 illustrates example electrical components and data flows for a wireless transmission system 200 with a mechanism for dynamic transmission power adjustment. The wireless transmission system 200 includes a radio frequency (RF) transmitter 202, a transmitting antenna 204, a detuning monitor 206, and a proximity detector 208. RF transmitter 202 may be a power amplifier with a variable gain control input. The transmit power of RF transmitter 202 may be based on the signal provided to the gain control input. The detuning monitor 206 includes a coupler 210 (e.g., a directional coupler). In an example implementation, a directional coupler may be constructed from two coupled transmission lines between an RF transmitter interface 212 and an RF antenna interface 214. The coupled transmission lines are routed close enough that transmission characteristics (e.g., power, phase, and other RF parameters.) passing through one transmission line is coupled to the other transmission line, allowing the transmission characteristics passing through the RF transmitter interface 212 and the transmission characteristics passing through the RF antenna interface 214 to be measured by the proximity detector 208. Proximity of a conductive body 201 may be indicated by changes in reflection of the transmitted signal via coupling with the conductive body 201 moving into proximity of the RF transmitting antenna 204. Alternatively, these changes may be referred to as being indicative of detuning of the RF transmitting antenna 204 by the proximity of the conductive body 201.

The proximity detector 208 detects the measured transmission characteristics at the input (e.g., RF transmitter interface 212) and at the output (e.g., RF antenna interface 214) to determine a measured VSWR. If the measured VSWR satisfies the predetermined acceptable VSWR condition, relative to a baseline VSWR, then the proximity detector 208 signals the RF transmitter 202 to transmit at its standard power (or at some other power condition that is appropriate when an unacceptable proximity condition is not detected). If the measured VSWR does not satisfy the predetermined acceptable VSWR condition, relative to a baseline VSWR, then the proximity detector 208 signals the RF transmitter 202 to adjust its transmission power to a level set to satisfy the SAR constraints.

Figure 3:
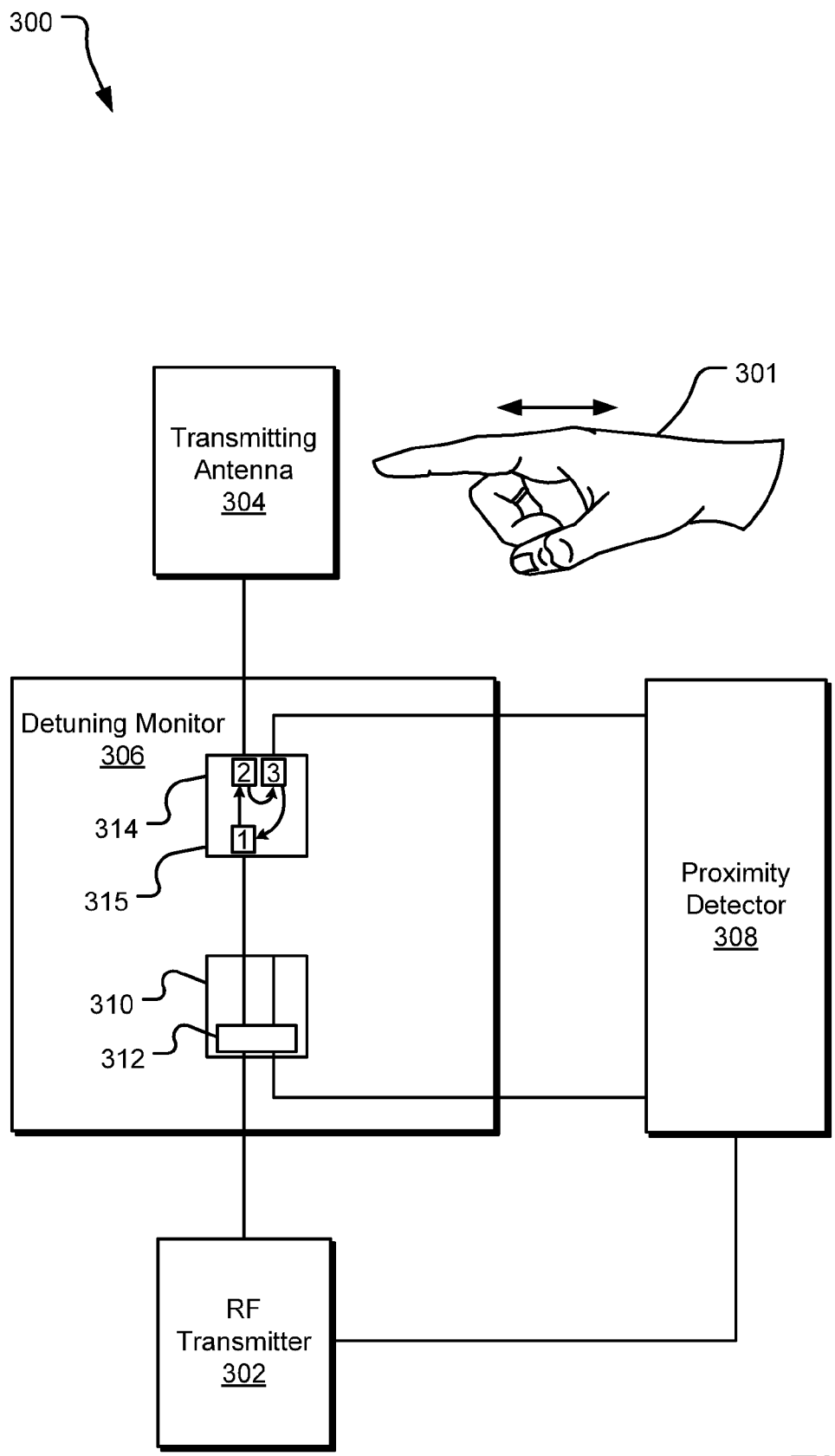
FIG. 3 illustrates another example electrical components and data flows for a wireless transmission system with a mechanism for dynamic transmission power adjustment.

FIG. 3 illustrates another example electrical components and data flows for a wireless transmission system 300 with a mechanism for dynamic transmission power adjustment. The wireless transmission system 300 includes a radio frequency (RF) transmitter 302, a transmitting antenna 304, a detuning monitor 306, and a proximity detector 308. The detuning monitor 306 includes a coupler 310 (e.g., a directional coupler) and a circulator 315. In an example implementation, a directional coupler may be constructed from two coupled transmission lines between an RF transmitter interface 312 and an output of the coupler 310. The coupled transmission lines are routed close enough that transmission characteristics passing through one transmission line is coupled to the other transmission line, allowing the transmission characteristics passing through the RF transmitter interface 312 to be measured by the proximity detector 308.

In an example implementation, a circulator may be constructed from a passive non-reciprocal multi-port device in which a radio frequency signal entering a port of the circulator is transmitted to another port in rotation (e.g., port 1 to port 2, port 2 to port 3, port 3 to port 1). As shown in FIG. 3, the transmitted RF signal received from the coupler 310 is received at port 1 and passed through port 2 to the RF antenna 304. The reflected signal from the RF antenna 304 is received at port 2 and passed through port 3 to the proximity detector 308, providing a signal indicative of the output transmission characteristics of the VSWR measured by the proximity sensor 308. Proximity of a conductive body 301 may be indicated by changes in reflection of the transmitted signal via coupling with the conductive body 301 moving into proximity of the RF transmitting antenna 304. Alternatively, these changes may be referred to as being indicative of detuning of the RF transmitting antenna 304 by the proximity of the conductive body 301.

The proximity detector 308 detects the measured transmission characteristics at the input (e.g., RF transmitter interface 312) and at the output (e.g., the RF antenna interface 314 is represented by ports 2 and 3 of the circulator 315) to determine a measured input-output VSWR. If the measured VSWR satisfies the predetermined acceptable VSWR condition, relative to a baseline VSWR, then the proximity detector 308 signals the RF transmitter 302 to transmit at its standard power (or at some other power condition that is appropriate when an unacceptable proximity condition is not detected). If the measured VSWR does not satisfy the predetermined acceptable VSWR condition, relative to a baseline VSWR, then the proximity detector 308 signals the RF transmitter 302 to adjust its transmission power to a level set to satisfy the SAR constraints.

Figure 4:
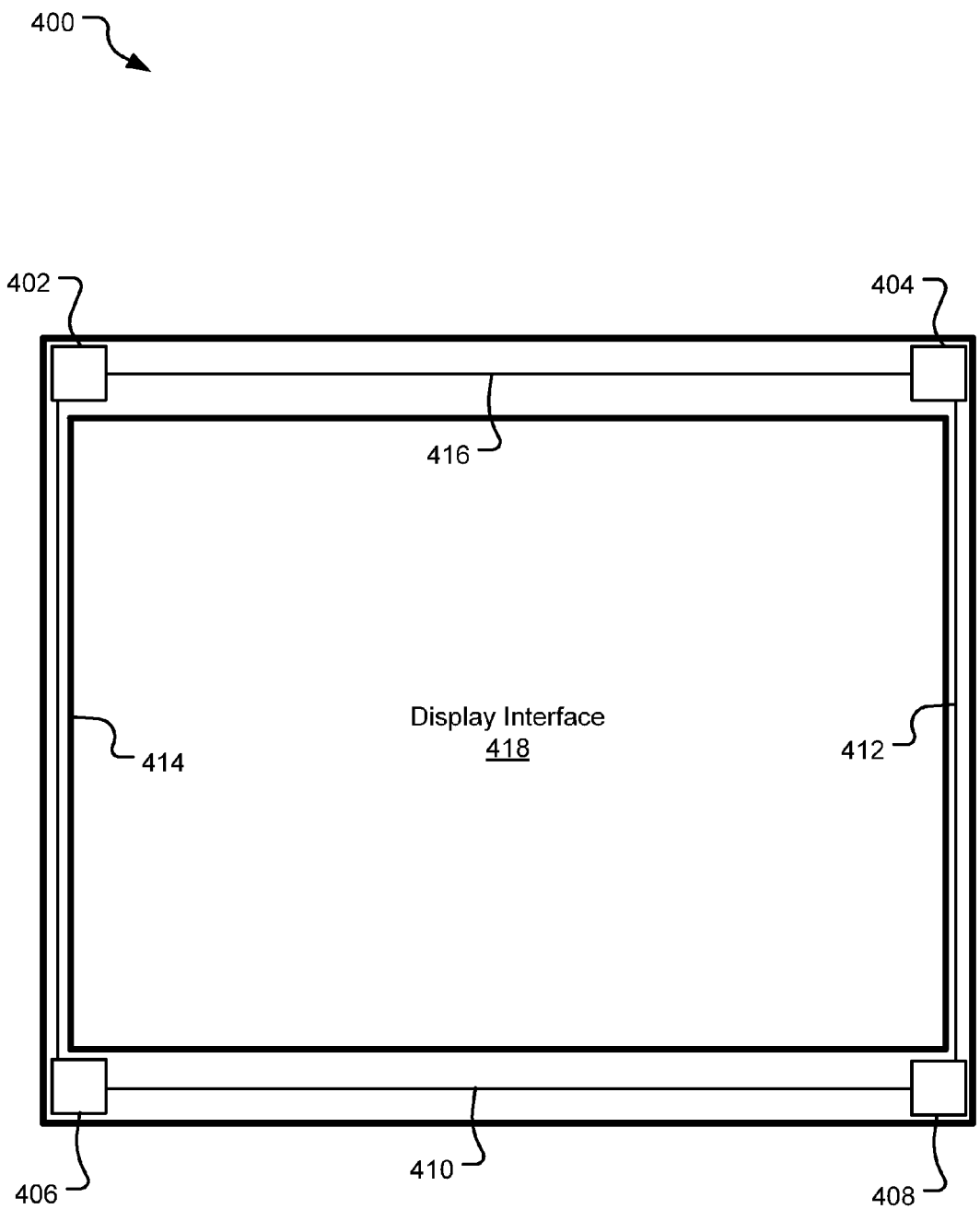
FIG. 4 illustrates an example network of antenna subsystems in an electronic device.

FIG. 4 illustrates an example network of antenna subsystems 402, 404, 406, and 408 in an electronic device 400, such as a tablet computing device, a laptop computing device, a set-top box, a wearable computing device, a smartphone, or any device with an RF subsystem. The antenna subsystems 402, 404, 406, and 408 are networked by communicative couplings 410, 412, 414, and 416. The electronic device 400 also includes a display interface 418 (e.g., a display screen), although other implementations may not include a display interface. The electronic device 400 illustrates a system having networked, proximity-detecting antenna subsystems 402, 404, 406, and 408 distributed at disparate locations in the electronic device 400, wherein the antenna subsystems 402, 404, 406, and 408 take advantage of the locational disparity within the electronic device 400 to improve device performance and/or compliance with SAR constraints. For example, if unacceptable proximity of a conductive body is detected by the antenna subsystem 404, the transmission power of the antenna subsystem 404 may be decreased to comply with SAR constraints while the transmission power of one or more of the antenna subsystems 402, 406, and 408 may be increased (assuming they comply with predefined acceptable VSWR conditions) to offset the decreased transmission power of the antenna subsystem 404. In an alternative implementation, which may be supplemented with one or more of the implementations described herein, the electronic device 400 may be configured to interpret concurrent failures of all four antenna subsystems 402, 404, 406, and 408 as a condition that does not require an adjustment of transmission power of any of the four antenna subsystems 402, 404, 406, and 408 (e.g., interpreting the conductive body to be a conductive surface, like a table top, rather than a human body part). More than four antenna subsystems may be so networked to coordinate SAR compliance and transmission power management.

Other conditions may also be employed. For example, transmission power adjustments may be based on a certain number of proximity-sensing antenna subsystems detecting an unacceptable proximity condition, the relative or absolute locations of proximity-sensing antenna subsystems detecting an unacceptable proximity condition, the transmission performance of individual proximity-sensing antenna subsystems (e.g., transmission power of an antenna subsystem detecting an unacceptable proximity condition may be reduced to zero if acceptable performance is being obtained via other antenna subsystems), etc.

Figure 5:
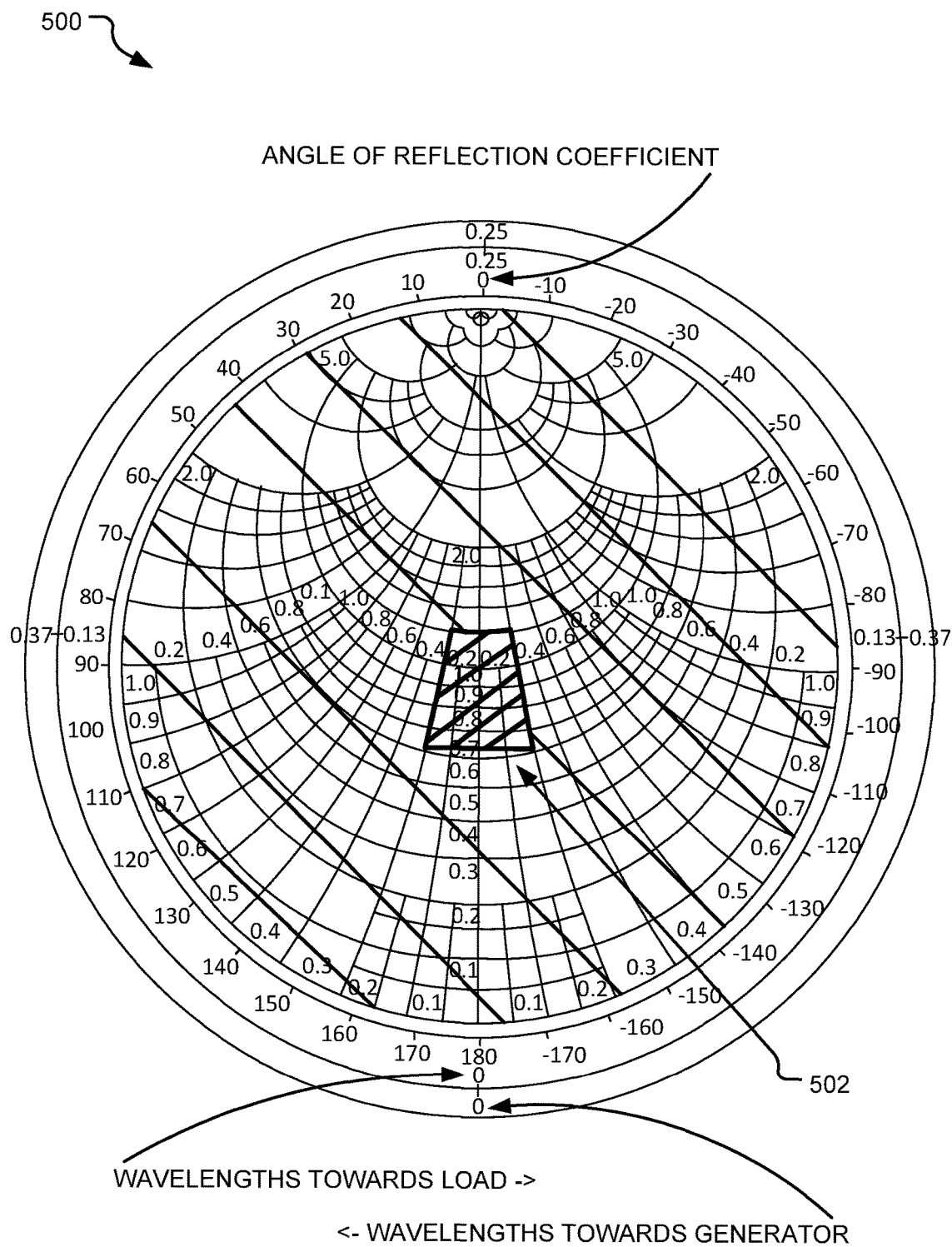
FIG. 5 illustrates an example illustrates a Smith chart showing a region satisfying a predefined acceptable VSWR condition.

FIG. 5 illustrates an example illustrates a Smith chart 500 showing a region 502 satisfying a predefined acceptable VSWR condition. The region 502 was determined by experimental means at a signal transmission frequency for a given transmission power. Similar charts may be generated at various frequencies to determine a region satisfying a predefined acceptable VSWR condition. The results of these expriement at useful frequencies may be programmed into a device such that the device could determine whether a dielectric body is too close to the antenna and in violation of a SAR requirement. Similar predefined acceptable VSWR conditions can be determined for different transmission powers. Such predefined acceptable VSWR conditions can be stored in registers, memory, or other circuitry accessible by a proximity detector to determine whether, under certain combinations of transmission frequency and transmission power, a particular antenna subsystem is operating in an acceptable proximity condition.

For example, if an antenna system is designed to transmit WiFi RF transmissions based on the IEEE 802.11 specification, a region of acceptable SAR could be determined for frequencies of in the range 2400 to 2500 MHz. Experiments may show that a VSWR above −12 dB occurs when a hand is within 3 cm of a device with an antenna transmitting at 2400 MHz. These experimental results may be stored in the device and used to determine when RF transmission power should be reduced based on a measure VSWR of −12 dB, −10 dB or higher.

Figure 6:
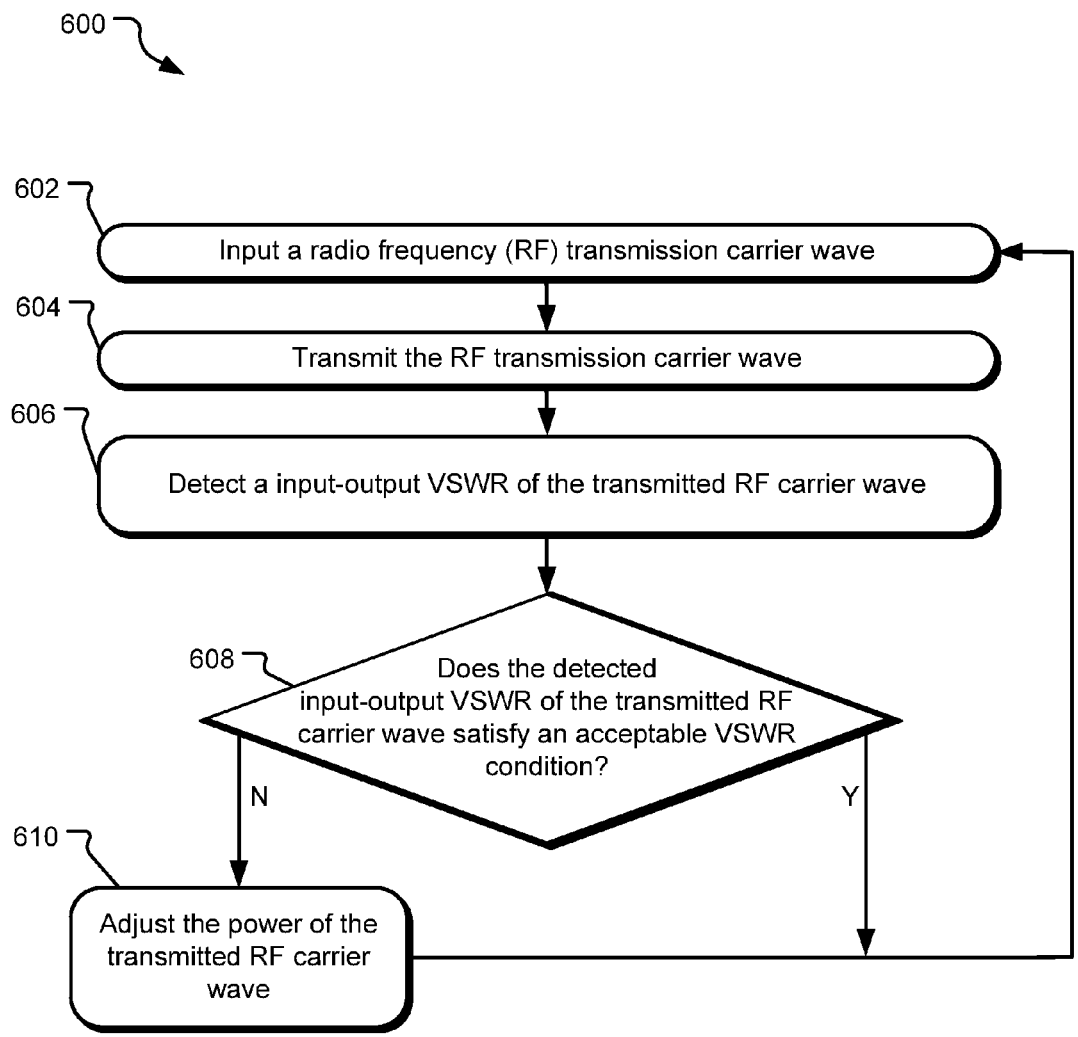
FIG. 6 illustrates example operations for a wireless transmission system with dynamic transmission power adjustment.

FIG. 6 illustrates example operations 600 for a wireless transmission system with dynamic transmission power adjustment. An input operation 602 inputs an RF transmission carrier wave, such as through a detuning monitor to an RF antenna. A transmitting operation 604 transmits the RF transmission carrier wave. A detecting operation 606 detects a VSWR of the transmitted RF carrier wave between the input and output of a detuning monitor between the transmitter and the transmitting antenna.

A decision operation 608 determines whether the detected VSWR satisfies a predefined acceptable VSWR condition, relative to a baseline VSWR measurement. If so, processing proceeds to the inputting operation 602 for another iteration. If not, a conductive body is deemed within an unacceptable proximity to the transmitting antenna, and an adjustment operation 610 adjusts the transmission power of a transmitter transmitting the RF carrier wave and then proceeds to the inputting operation 602 for another iteration. In one implementation, the adjustment operation 610 adjusts the transmission power to satisfy SAR constraints, although this adjustment may occur in one iteration or over multiple iterations.

Figure 7:
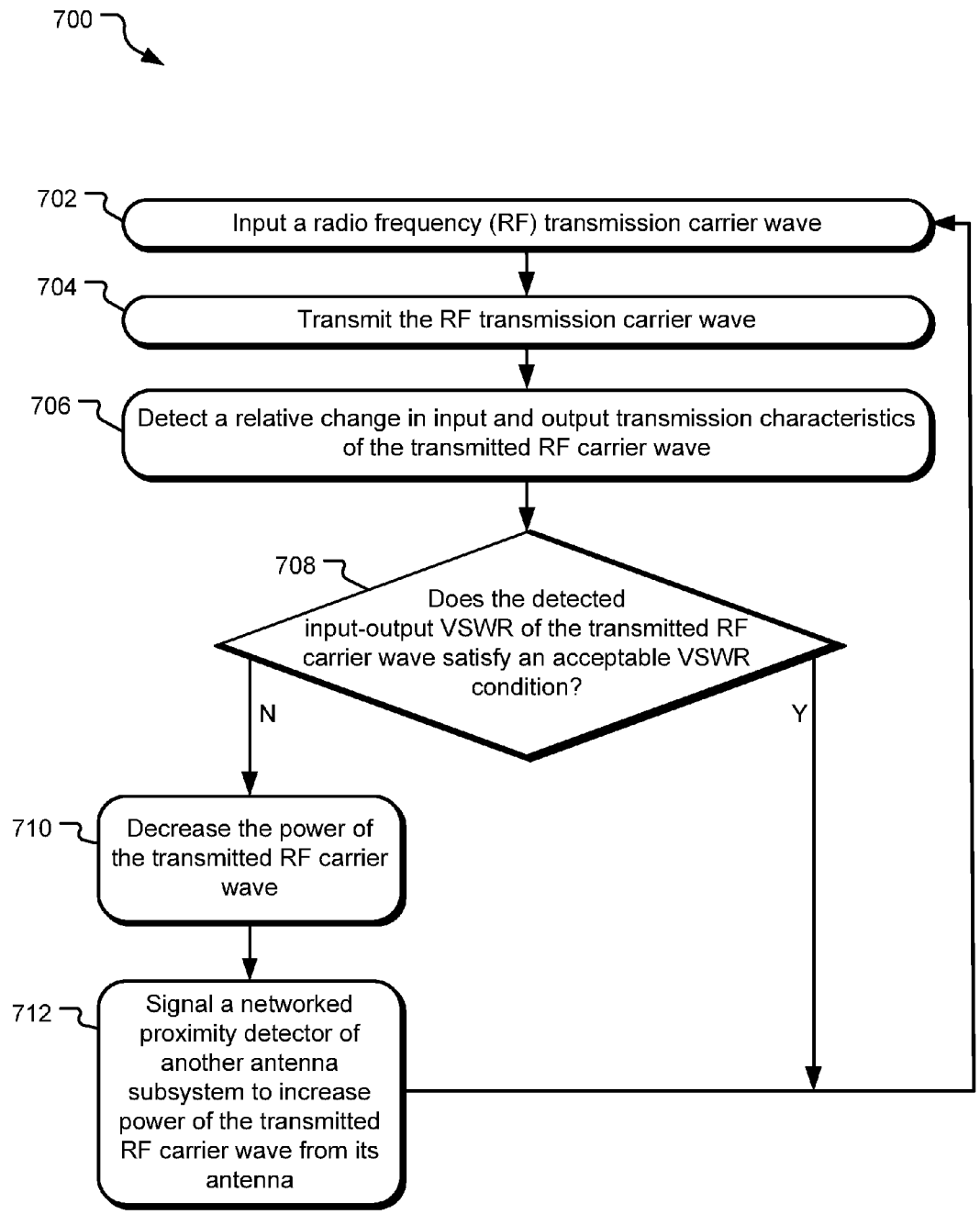
FIG. 7 illustrates alternative example operations for a wireless transmission system with dynamic transmission power adjustment.

FIG. 7 illustrates alternative example operations 700 for a wireless transmission system with dynamic transmission power adjustment. An input operation 702 inputs an RF transmission carrier wave, such as through a detuning monitor to an RF antenna. A transmitting operation 704 transmits the RF transmission carrier wave. A detecting operation 706 detects a VSWR of the transmitted RF carrier wave between the input and output of a detuning monitor between the transmitter and the transmitting antenna.

A decision operation 708 determines whether the detected VSWR satisfies a predefined acceptable VSWR condition, relative to a baseline VSWR measurement. If so, processing proceeds to the inputting operation 702 for another iteration. If not, a conductive body is deemed within an unacceptable proximity to the transmitting antenna, and an adjustment operation 710 decreases the transmission power of a transmitter transmitting the RF carrier wave. A signaling operation 712 signals a networked proximity detector of another antenna to increase its transmission power to offset (in full or in part) the decrease in the power of the transmitter of the first antenna (e.g., if the proximity detector of the other antenna does not indicate an unacceptable proximity condition) and then processing proceeds to the inputting operation 702 for another iteration.

In one implementation, the adjustment operation 710 decreases the transmission power to satisfy SAR constraints, although this adjustment may occur in one iteration or over multiple iterations. Likewise, the increase in the transmission power of another antenna subsystem may occur in one iteration or over multiple iterations.

Individual operations illustrated in FIGS. 6 and 7 may be performed in sequence or concurrently. For example, the inputting and transmitting operations 602 and 604 may occur concurrently with the detecting, decision, and adjusting operations 606, 608, and 610, as various portions of the RF transmission carrier wave may be affected by these operations at any particular moment in time. Accordingly, the operations illustrated in FIGS. 6 and 7 illustrate logical operations performed by circuitry or a combination of circuitry, software, and mechanical structures Accordingly, various implementations of an electrical device are disclosed, wherein the electrical device comprises means for detecting a change in a voltage standing wave ratio (VSWR) between a RF transmitter and an RF antenna relative to a predetermined VSWR baseline and means for adjusting transmission power of a carrier wave transmitted from the RF transmitter, if the change fails to satisfy an acceptable VSWR condition. For example, in one implementation, a detuning monitor detecting a change in a voltage standing wave ratio (VSWR) between a RF transmitter and an RF antenna relative to a predetermined VSWR baseline, and a proximity monitor adjusts transmission power of a carrier wave transmitted from the RF transmitter, if the change fails to satisfy an acceptable VSWR condition.

In another implementation, a transmission power adjustment circuit or the RF transmitters themselves may adjust the transmission power, for example, responsive to a signal from one or more proximity detectors.

Among other implementations of the described technology, a method is disclosed including detecting a change in a voltage standing wave ratio (VSWR) between a radio frequency (RF) transmitter and an RF antenna relative to a predetermined VSWR baseline and adjusting transmission power of a carrier wave transmitted from the RF transmitter, if the change fails to satisfy an acceptable VSWR condition. The method may include a detecting operation that includes measuring VSWR between an input and an output of a detuning monitor coupled between the RF transmitter and the RF antenna. The method may include a detecting operation that includes measuring VSWR between an input and an output of a directional coupler connected between the RF transmitter and the RF antenna.

The method may employ a detuning monitor that includes a coupler connected to the RF transmitter and a circulator connected between the coupler and the RF antenna, wherein the detecting operation includes measuring VSWR between an input of a coupler and an output of the circulator. A first port of the circulator is connected to an output of the coupler, a second port of the circulator is connected to the RF antenna, and a third port of the circulator is connected to a proximity detector. The method may include an adjusting operation that determines whether the change fails to satisfy an acceptable VSWR condition using the proximity detector.

The method may include detecting an unacceptable detuning of the RF antenna based on a change in the VSWR from a VSWR baseline that fails to satisfy an acceptable VSWR condition. The method may include communicatively connecting a proximity detector associated with the RF transmitter to another proximity detector associated with another RF transmitter and signaling the other RF transmitter to increase transmission power to another RF antenna.

The method may include communicatively connecting a proximity detector associated with the RF transmitter to another proximity detector associated with another RF transmitter and signaling the other RF transmitter to increase transmission power to another RF antenna, if a detected change in the VSWR associated with the other RF transmitter and the other RF antenna satisfies an acceptable VSWR condition.

Among other implementations of the described technology, an electronic device is disclosed that includes a detuning monitor circuit configured to detect a change in a voltage standing wave ratio (VSWR) between a radio frequency (RF) transmitter and an RF antenna relative to a predetermined VSWR baseline and a proximity detector circuit configured to adjust transmission power of a carrier wave transmitted from the RF transmitter, if the change fails to satisfy an acceptable VSWR condition. The detuning monitor circuit may include a directional coupler connected between the RF transmitter and the RF antenna and to measure VSWR between an input and an output of the directional coupler.

The detuning monitor circuit may include a coupler configured for connection to the RF transmitter and to measure VSWR between an input of a coupler and an output of a circulator. A first port of the circulator may be connected to an output of the coupler, a second port of the circulator may be configured for connection to the RF antenna, and a third port of the circulator may be connected to the proximity detector circuit. The proximity detector circuit may be further configured to determine whether the change fails to satisfy an acceptable VSWR condition.

The proximity detector circuit of the electronic device may be configured to detect an unacceptable detuning of the RF antenna based on a change in the VSWR from a VSWR baseline that fails to satisfy an acceptable VSWR condition. The proximity detector circuit of the electronic device may be connected between the RF transmitter and the RF antenna, and the electronic device may include another proximity detector circuit communicatively connected to the proximity detector circuit. The other proximity detector circuit is connected to another RF transmitter, and the proximity detector circuit is configured to signal the other RF transmitter to increase transmission power to another RF antenna.

The proximity detector circuit of the electronic device may be connected between the RF transmitter and the RF antenna and the electronic device may include another proximity detector circuit communicatively connected to the proximity detector circuit. The other proximity detector circuit is connected to another RF transmitter. The proximity detector circuit is configured to signal the other RF transmitter connected to increase transmission power to another RF antenna, if a detected change in the VSWR associated with the other RF transmitter and the other RF antenna satisfies an acceptable VSWR condition.

Among other implementations of the described technology, a transmission system is disclosed that includes an antenna and a detuning monitor circuit coupled to the antenna. The detuning monitor may include a first coupler port and a second coupler port in communication with the antenna. The detuning monitor may also include a first sense port, and a second sense port. The transmission system may also include a power amplifier including a gain control input and a signal output in communication with the first coupler port. The transmission system may also include a proximity detector circuit including a first input in communication with the first sense port, a second input in communication with the second sense port, and an output in communication with the gain control input. The proximity detector circuit of the transmission system may be configured to determine a VSWR value based on a first signal detected at the first input and a second signal detected at the second input. The proximity detector circuit of the transmission system may be also or alternatively be configured to communicate a gain control signal to the gain control input, wherein the gain control signal is based on the VSWR value.

Among other implementations of the described technology, an electronic device is disclosed including a radio frequency (RF) transmitter, an RF antenna, a detuning monitor circuit configured to detect a change in a voltage standing wave ratio (VSWR) between the RF transmitter and the RF antenna relative to a predetermined VSWR baseline, and a proximity detector circuit configured to adjust transmission power of a carrier wave transmitted from the RF transmitter, if the change fails to satisfy an acceptable VSWR condition. The proximity detector circuit may be connected between the RF transmitter and the RF antenna and the electronic device may include another RF transmitter, another RF antenna, and another proximity detector circuit communicatively connected to the proximity detector circuit. The other proximity detector circuit may be connected between the other RF transmitter and the other RF antenna. The proximity detector circuit may be configured to signal the other RF transmitter via the other proximity detector to increase transmission power to another RF antenna.

The proximity detector circuit of the electronic device may be connected between the RF transmitter and the RF antenna. The electronic device may include another RF transmitter, another RF antenna, and another proximity detector circuit communicatively connected to the proximity detector circuit. The other proximity detector circuit may be connected between the other RF transmitter and the other RF antenna. The proximity detector circuit may be configured to signal the other RF transmitter via the other proximity detector circuit to increase transmission power to another RF antenna, if a detected change in the VSWR associated with the other RF transmitter and the other RF antenna satisfies an acceptable VSWR condition.

The implementations of the invention described herein are implemented as logical steps in one or more computer systems. The logical operations of the presently described technology may be implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method comprising:
   detecting a change in a voltage standing wave ratio (VSWR) between a radio frequency (RF) transmitter and an RF antenna relative to a predetermined VSWR baseline; and
   identifying an applicable VSWR condition of a plurality of predefined VSWR conditions corresponding to various signal transmission frequencies, each of the predefined VSWR conditions indicative of a VSWR observable at a corresponding one of the various signal transmission frequencies when a conductive body is not within a threshold proximity of the RF antenna; and
   adjusting transmission power of a carrier wave transmitted from the RF transmitter, if the change fails to satisfy the applicable VSWR condition.

2. The method of claim 1 wherein the detecting operation comprises:
   measuring VSWR between an input and an output of a detuning monitor coupled between the RF transmitter and the RF antenna.

3. The method of claim 1 wherein the detecting operation comprises:
   measuring VSWR between an input and an output of a directional coupler connected between the RF transmitter and the RF antenna, the directional coupler including first and second transmission lines routed in proximity such that transmission characteristics passing through the first transmission line are measurable along the second transmission line.

4. The method of claim 2 wherein the detuning monitor includes a coupler connected to the RF transmitter and further includes a circulator connected between the coupler and the RF antenna, and the detecting operation comprises:
measuring VSWR between an input of the coupler and an output of the circulator.

5. The method of claim 4 wherein a first port of the circulator is connected to an output of the coupler, a second port of the circulator is connected to the RF antenna, and a third port of the circulator is connected to a proximity detector.

6. The method of claim 5 wherein the adjusting operation further comprises:
determining whether the change fails to satisfy an acceptable VSWR condition using the proximity detector.

7. The method of claim 1 wherein the detecting operation comprises:
detecting an unacceptable detuning of the RF antenna based on a change in the VSWR from a VSWR baseline that fails to satisfy an acceptable VSWR condition.

8. The method of claim 1 further comprising:
communicatively connecting a proximity detector associated with the RF transmitter to another proximity detector associated with another RF transmitter; and
signaling the other RF transmitter to increase transmission power to another RF antenna.

9. The method of claim 1 further comprising:
communicatively connecting a proximity detector associated with the RF transmitter to another proximity detector associated with another RF transmitter; and
signaling the other RF transmitter to increase transmission power to another RF antenna, if a detected change in the VSWR associated with the other RF transmitter and the other RF antenna satisfies an acceptable VSWR condition.

10. An electronic device comprising:
a detuning monitor circuit configured to detect a change in a voltage standing wave ratio (VSWR) between a radio frequency (RF) transmitter and an RF antenna relative to a predetermined VSWR baseline; and
a proximity detector circuit configured to identify an applicable VSWR condition of a plurality of predefined VSWR conditions corresponding to various signal transmission frequencies each indicative of a VSWR observable at a corresponding one of the various signal transmission frequencies when a conductive body is not within a threshold proximity of the RF antenna, wherein the proximity detector circuit is further configured to adjust transmission power of a carrier wave transmitted from the RF transmitter, if the change fails to satisfy the applicable VSWR condition.

11. The electronic device of claim 10 wherein the detuning monitor circuit includes a directional coupler connected between the RF transmitter and the RF antenna and is further configured to measure VSWR between an input and an output of the directional coupler, the directional coupler including first and second transmission lines routed in proximity such that transmission characteristics passing through the first transmission line are measurable along the second transmission line.

12. The electronic device of claim 10 wherein the detuning monitor circuit includes a coupler configured for connection to the RF transmitter and is further configured to measure VSWR between an input of the coupler and an output of a circulator.

13. The electronic device of claim 12 wherein a first port of the circulator is connected to an output of the coupler, a second port of the circulator is configured for connection to the RF antenna, and a third port of the circulator is connected to the proximity detector circuit.

14. The electronic device of claim 13 wherein proximity detector circuit is further configured to determine whether the change fails to satisfy an acceptable VSWR condition.

15. The electronic device of claim 10 wherein proximity detector circuit is further configured to detect an unacceptable detuning of the RF antenna based on a change in the VSWR from a VSWR baseline that fails to satisfy an acceptable VSWR condition.

16. The electronic device of claim 10 wherein the proximity detector circuit is connected between the RF transmitter and the RF antenna and further comprising:
another proximity detector circuit communicatively connected to the proximity detector circuit, the other proximity detector circuit being connected to another RF transmitter, the proximity detector circuit being configured to signal the other RF transmitter to increase transmission power to another RF antenna.

17. The electronic device of claim 10 wherein the proximity detector circuit is connected between the RF transmitter and the RF antenna and further comprising:
another proximity detector circuit communicatively connected to the proximity detector circuit, the other proximity detector circuit being connected to another RF transmitter, the proximity detector circuit being configured to signal the other RF transmitter connected to increase transmission power to another RF antenna, if a detected change in the VSWR associated with the other RF transmitter and the other RF antenna satisfies an acceptable VSWR condition.

18. An electronic device comprising:
a radio frequency (RF) transmitter;
an RF antenna;
a detuning monitor circuit configured to detect a change in a voltage standing wave ratio (VSWR) between the RF transmitter and the RF antenna relative to a predetermined VSWR baseline; and
a proximity detector circuit configured to identify an applicable VSWR condition of a plurality of predefined VSWR conditions corresponding to various signal transmission frequencies each indicative of a VSWR observable at a corresponding one of the various signal transmission frequencies when a conductive body is not within a threshold proximity of the RF antenna, and wherein the proximity detector circuit is further configured to adjust transmission power of a carrier wave transmitted from the RF transmitter, if the change fails to satisfy the applicable VSWR condition.

19. The electronic device of claim 18 wherein the proximity detector circuit is connected between the RF transmitter and the RF antenna and further comprising:
another RF transmitter;
another RF antenna;
another proximity detector circuit communicatively connected to the proximity detector circuit, the other proximity detector circuit being connected between the other RF transmitter and the other RF antenna, the proximity detector circuit being configured to signal the other RF transmitter via the other proximity detector to increase transmission power to another RF antenna.

20. The electronic device of claim 18 wherein the proximity detector circuit is connected between the RF transmitter and the RF antenna and further comprising:

another RF transmitter;
another RF antenna;
another proximity detector circuit communicatively connected to the proximity detector circuit, the other proximity detector circuit being connected between the other RF transmitter and the other RF antenna, the proximity detector circuit being configured to signal the other RF transmitter via the other proximity detector to increase transmission power to another RF antenna, if a detected change in the VSWR associated with the other RF transmitter and the other RF antenna satisfies an acceptable VSWR condition.

* * * * *